H. S. HALE.
Chair-Bottom

No. 8,041. Reissued Jan. 15, 1878.

Witnesses
Harry Haugen Jr
Harry Smith

Henry S. Hale
by his Attorneys
Howson and Son

N. PETERS, PHOTO-LITHOGRAPHER, WASHINGTON, D. C.

UNITED STATES PATENT OFFICE.

HENRY S. HALE, OF PHILADELPHIA, PENNSYLVANIA.

IMPROVEMENT IN CHAIR-BOTTOMS.

Specification forming part of Letters Patent No. 146,065, dated December 30, 1873; Reissue No. 8,041, dated January 15, 1878; application filed December 17, 1875.

*To all whom it may concern:*

Be it known that I, HENRY S. HALE, of Philadelphia, Pennsylvania, have invented an Improvement in Slatted Frames for Chairs, &c., of which the following is a specification:

The object of my invention is the construction of a slatted frame which shall possess the properties of economy, elasticity, strength, and durability; and this object I attain by combining with the frame of a chair-seat or chair-back, or with the frames of other objects, thin elastic strips of wood united to a backing of canvas, or other suitable backing.

The wooden slats A are arranged side by side, and glued or otherwise cemented to a backing of canvas or other suitable fabric, and are rounded at the edges, so that they may be self-accommodating with the canvas backing to the general curve of the chair-seat or back to which they are applied.

Figure 1:
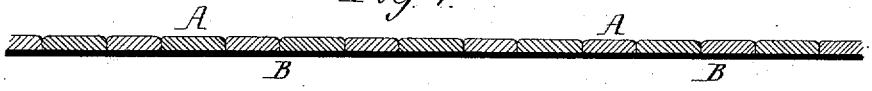
Figure 4:
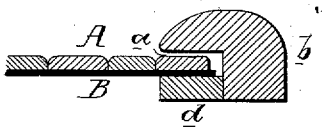
Figure 3:
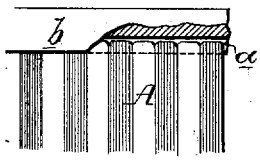
Figure 2:
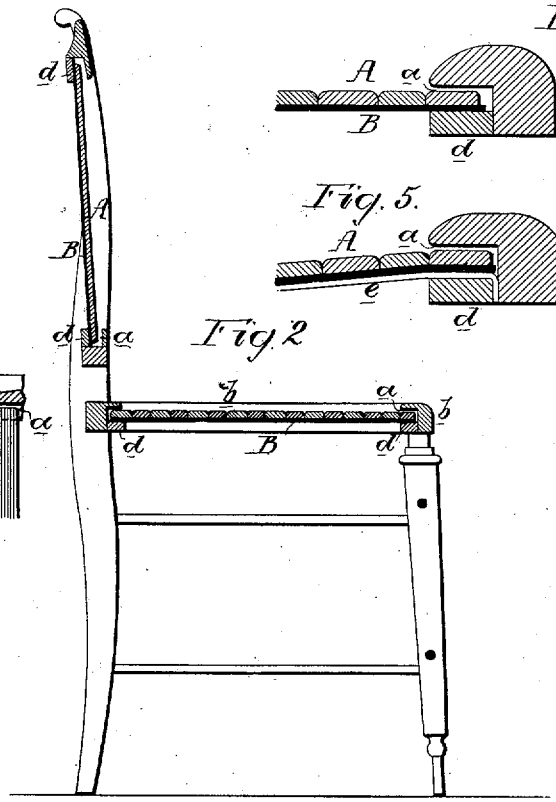

As illustrated in Fig. 2, in the plan view, Fig. 3, and enlarged section, Fig. 4, the combined material is used as a substitute for the usual cane net-work, the seat-frame *b* being recessed at both front and back and sides, and a strip, *d*, being secured to the under side of the recessed portion, so as to form a continuous groove, *a*, for the reception and retention of the edges of the material.

Figure 5:
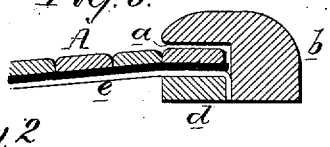

I propose, in some instances, when my invention is applied to the seat of a chair, to reenforce and strengthen the combined material by a strip or strips, *e*, of fabric or thin steel, extending beneath the same, and secured to the opposite sides of the seat-frame, as shown in the enlarged sectional view, Fig. 5.

In applying the material to the backs of chairs, I intend, in some cases, to adopt the same plan as that described in connection with the seat, and in other instances to adapt the ends only of the strips A to grooves in the frame.

Figure 6:
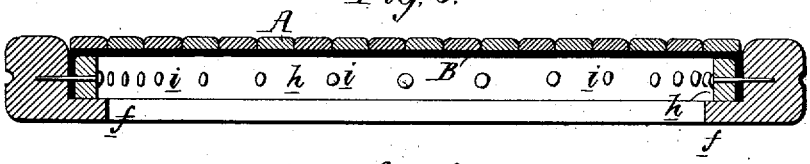

The enlarged sectional view, Fig. 6, illustrates another method of securing the material to a chair-seat, the interior of the latter, which is supposed to be circular in the present instance, being recessed to form a shoulder, *f*, upon which rests a thick strip of rubber, *h*. The rubber sustains and imparts additional elasticity to the material, which is secured by extending a portion of the canvas behind the rubber and fastening the whole by nails *i*.

Figure 7:
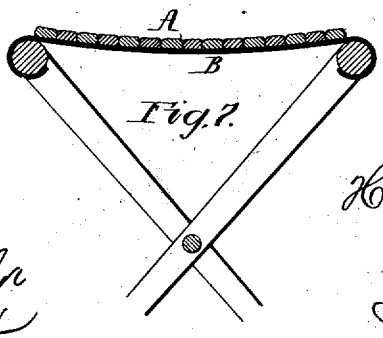

The combined material, being flexible, is especially applicable to the backs and seats of folding chairs, and to camp chairs or stools, as shown in Fig. 7. It may also be used for settees, and for the seats of street-cars and other objects.

I do not desire to claim, broadly, a compound material made by securing wooden slats to a backing of textile fabric; but

I claim as my invention—

1. The combination, for chair-seats and other articles of furniture, of a frame having grooves in its inner edges, with a panel composed of wooden strips united to a backing of fabric, the said panel being fitted into the grooves of the frame, and depending upon the latter for its integrity and support, all as set forth.

2. The within-described compound material, consisting of wooden strips, rounded at the edges, and secured to a backing of textile fabric, as and for the purpose specified.

In testimony whereof I have signed my name to this specification in the presence of two subscribing witnesses.

HENRY S. HALE.

Witnesses:

HARRY SMITH,

HARRY HOWSON, Jr.